Oct. 25, 1955   L. F. GIESE ET AL   2,721,719
ADJUSTABLE BRACKET

Filed Sept. 15, 1951   2 Sheets-Sheet 1

INVENTORS
Lawrence F. Giese
Donald W. Harting
BY
Arnold J. Ericson
Attorney

Oct. 25, 1955                L. F. GIESE ET AL                2,721,719
                            ADJUSTABLE BRACKET
Filed Sept. 15, 1951                                    2 Sheets-Sheet 2

INVENTORS
Lawrence F. Giese
Donald W. Harling
BY

Arnold J. Ericsen
Attorney

United States Patent Office 2,721,719
Patented Oct. 25, 1955

2,721,719

ADJUSTABLE BRACKET

Lawrence F. Giese and Donald W. Harling, Milwaukee, Wis., assignors to McGraw Electric Company, Milwaukee, Wis., a corporation of Delaware Application September 15, 1951, Serial No. 246,812

1 Claim. (Cl. 248—221)

This invention relates to an improved bracket, and particularly pertains to an adjustable bracket for supporting mast arms.

It is an object of the present invention to provide an adjustable bracket for supporting an upsweep mast arm, which bracket permits a secure grasp of the mast arm, and which is capable of releasably grasping the mast arm for permitting vertical adjustment of the arm.

It is an other object of this invention to provide a one-piece bracket for supporting a mast arm, which bracket includes U-bolt members for releasably grasping the mast arm to permit adjustment of the arm.

It is a further object of the present invention, in its preferred embodiment, to provide a mast arm mounting bracket having a contoured seating portion cooperating with the contour of said mast arm to provide a locking engagement preventing twisting or turning laterally of the mast arms.

It is a specific object of my invention to provide a new and improved form of an overhead mast arm bracket such as may be used in conjunction with street and overhead lighting installations.

Figure 1:
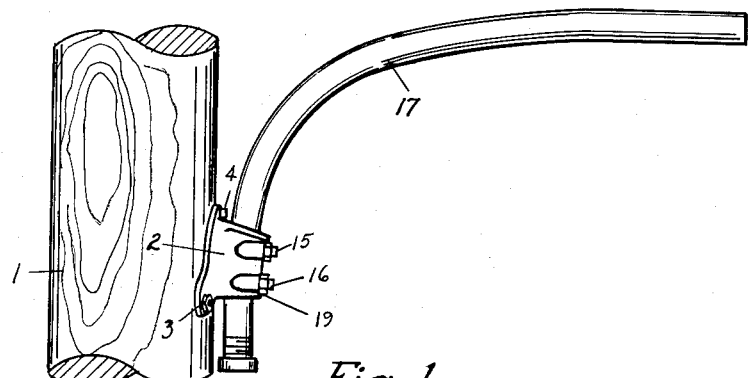
Fig. 1 is an elevation of an installation of a mast arm supported by the novel bracket, the whole assembly shown mounted on an upright.

Referring particularly to Fig. 1, there is shown a supporting pole 1 which may be either of hollow metal or a standard wood pole as desired. The novel pole plate bracket 2 may be fastened to the pole by means of lag screws 3 and a suspension lag screw 4. The bracket 2 is preferably cast in one piece as shown. The mounting base portion 5 is provided with projecting ears 6. The ears are each provided with an opening 7 for receiving the mounting, or lag screws 3. An opening 8 in the base portion 5 is slotted at its upper end as indicated by reference character 9, which slot is adapted to receive the suspension screw 4. After the bracket has been mounted upon the screw 4 the lag screws 3 are positioned to securely fasten the bracket to the mounting pole. It will be apparent that the opening 8 is preferably provided for mounting on hollow poles where electrical conduit may be threaded into the opening 8 through the bore of the hollow pole to electrical connections below (not shown). Obviously, the bracket could be made without the opening and remain within the scope of this invention.

Figure 2:
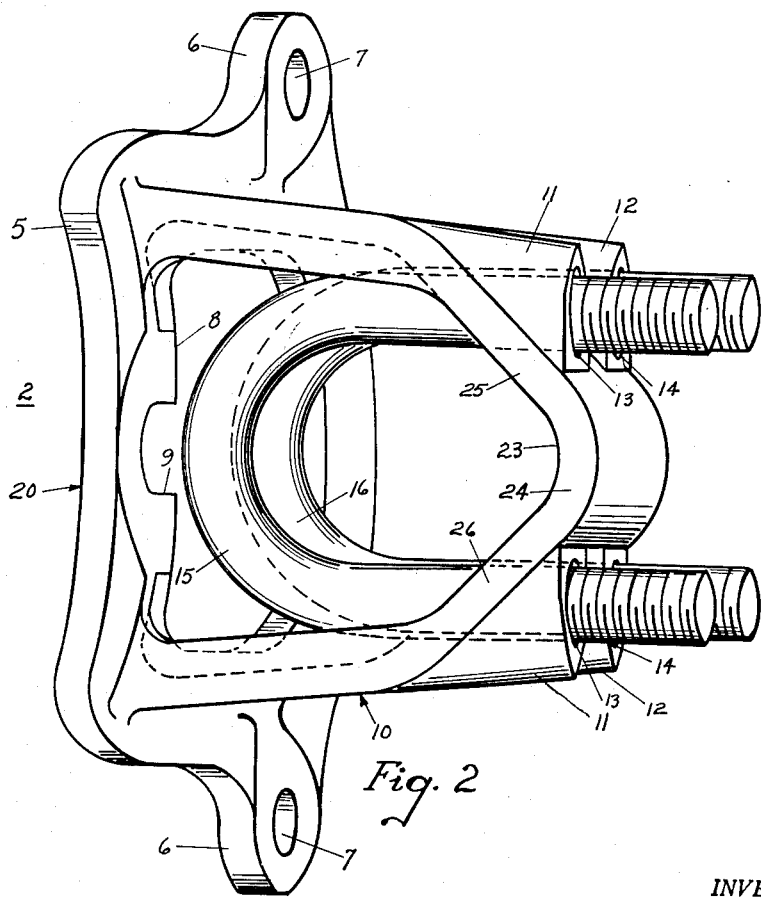
Fig. 2 is a top view taken on the lines 2—2 of Fig. 3 with the mast arm removed to show the novel bracket in detail.
Figure 3:
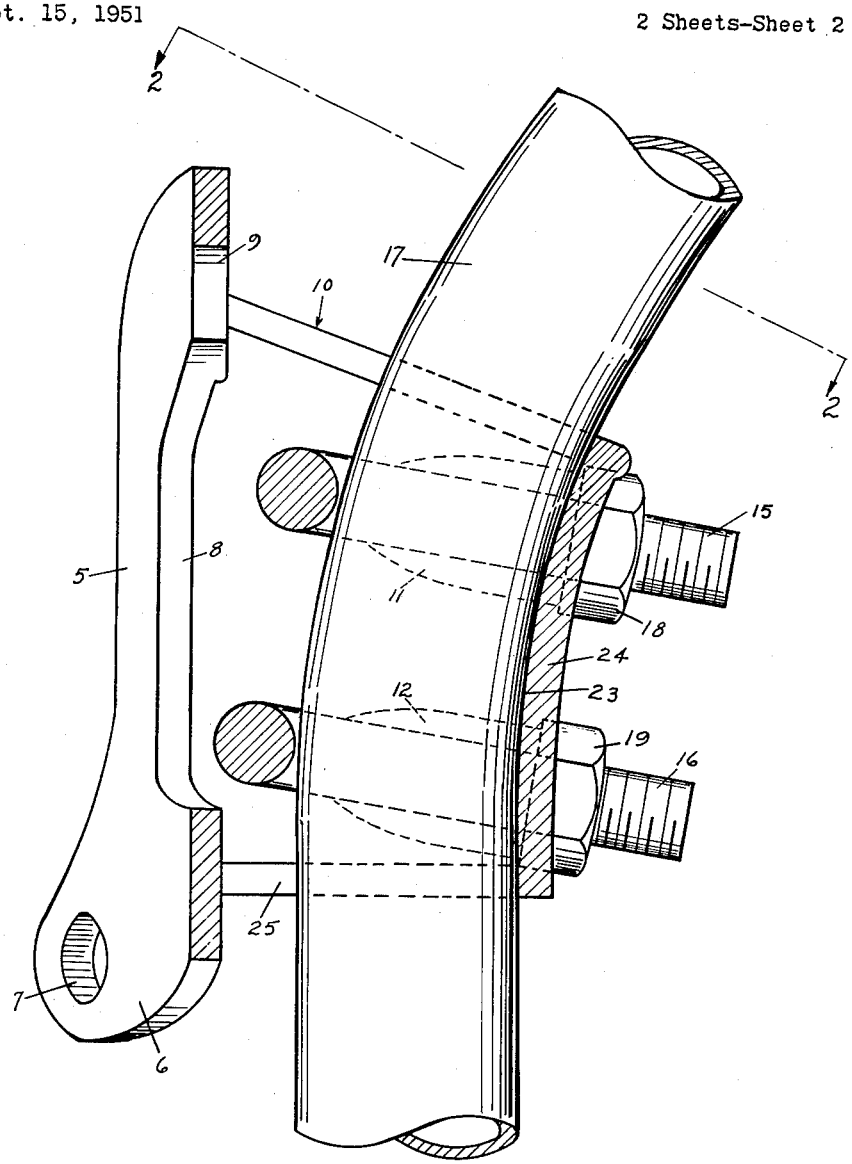
Fig. 3 is an enlarged sectional view of the bracket illustrated in Fig. 1, the mast arm being shown fragmentarily.

An anchoring projection 10 is preferably cast integral with the mounting base portion 5, but may be welded or bolted to the base if so desired. The projection 10 is preferably of a general U-shape as shown, and is provided with pairs of projecting bosses 11 and 12 having openings 13 and 14 respectively. The bosses are vertically spaced from one another. Each pair of bosses 11 and 12 respectively, is adapted to receive U-bolts 15 and 16, as shown in Fig. 2. The U-bolts are formed to releasably grasp a mast arm 17. Each arm of the U-bolt is threaded at its free end to receive nuts 18 and 19 and appropriate washers and lock washers. Although, the preferred embodiment utilizing an integral mounting base portion 5 is shown, it will be apparent that the base could be omitted and arms of the U-shaped projection 10 bent outwardly to form mounting ears or tabs (not shown) adapted to receive lag screws for securing the bracket to a pole or other upright. It is preferable when mounting the base on a pole to form the base portion with a contoured surface 20 conforming to the diameter of the pole.

The inner wall 23 of the seat portion 24 of the anchoring projection 10 is preferably formed with an upsweep curvature as shown in Fig. 2 adapted to conform with the curvature of the mast arm 17. Two U-bolts 15 and 16 have been indicated, but it is within the scope of this invention to provide one U-bolt located centrally of the projection 10 if so desired. As shown, the clamping seat 24 is provided by the junction of the arms 25 and 26 of the projection 10, and is preferably substantially V-shaped. The V-shaped seat provides a more secure grip on the mast arm 17 in conjunction with the U-bolts 15 and 16. Obviously, the arms 25 and 26 could be joined to provide a more rounded clamping seat (not shown), but the V-shape does insure a three-point contact for securing the gripping surface of the mast arm.

In many instances, street lighting brackets are mounted on poles which are raked or tilted back from the street. These poles are often raked in the opposite direction from which a guy wire is pulling or are tilted responsive to loads carried by suspension catenaries supporting trolley wires. Formerly, brackets integrally supporting mast arms required special shims under either the top or bottom, or some plumbing means to level the outer end of the mast arm. It will be apparent that the novel bracket structure disclosed herein will permit a leveling adjustment to be made by simply partially loosening the nuts on the U-bolts and moving the mast arm upwardly or downwardly as desired. After the proper adjustment has been made the nuts are again tightened, clamping the mast arm in place.

A special feature of the novel bracket lies in the fact that most street lighting mast arms are now of the upsweep type for maintaining additional mounting height. This invention takes advantage of the upsweep curve in the mast arm by providing a contoured inner wall 23 of the same, or substantially the same, curvature as the upsweep curve. The two curved surfaces clamped together offer a much greater lateral strength than would be obtained with a combination of both surfaces in vertical clamping relation. The mast arm is thus prevented from twisting or turning laterally, as either one part or the other must be deformed before the arm can be rotated in the bracket. One of the major advantages to the novel bracket is that the entire unit, including the mast arm and the bracket, may be mounted by one man. The operator need only fasten a suspension screw 4 in the upright. The entire unit may then be pre-positioned by an initial mounting of the slotted portion 9 upon the screw 4. After this pre-positioning operation, the remaining mounting screws 3 may be fastened.

It will be obvious that the novel bracket may be fastened to any vertical upright including a building wall surface where such installation is applicable. Where hollow supporting poles are used, the wires or conduit leading from the suspended lamp or other object (not shown) may be directed from the mast arm through the opening 8 of the novel bracket to an opening (not shown) in the wall of the hollow pole, thereafter making electrical connection at ground level.

Although the preferred embodiment has been shown with the inner wall 23 of the bracket 2 slightly curved to conform to the curvature of an upsweep mast arm, it is within the province of this invention to provide a substantially straight wall surface where the gripping portion of mast arms is straight. Where straight wall surfaces are utilized, complete freedom rotationally is permitted by simply loosening the nuts 18 and 19 on the U-bolts 15 and 16, respectively. It will be apparent that such embodiment will not provide the preferred locking action of a curved surface that is offered by the preferred embodiment. In addition, it is within the province of this invention to provide a mast arm bearing surface composed of inwardly projecting bosses on the inner wall (not shown), substantially following the preferred contour of the illustrated wall surface. With bearing surfaces of this nature, the wall surface could remain relatively straight vertically and of uniform dimension, while providing inward projections corresponding to the varying outside diameter dimensions of assorted mast arms. Although the novel structure preferably utilizes U-bolts as opposed clamping seats to be clamping seat 24, any structure providing slidably opposed clamping seats may be used.

What we claim as new and desire to secure by Letters Patent of the United States is:

An adjustable bracket adapted for mounting a mast arm on a vertical upright comprising a base plate having oppositely spaced mounting elements, a substantially U-shaped projection integral with the base plate intermediate said mounting elements, and having a clamping seat with an arcuate contour facing the base plate, the projection having oppositely spaced apertures positioned at each side of said clamping seat in spaced relation to the base plate, at least one U-shaped clamping member having its bight portion within said projection with the side legs thereof slidably extended through said spaced apertures to project away from the base plate and beyond said clamping seat, said base plate having an enlarged opening therein to facilitate insertion of the U-shaped clamping members into said projection and securing means on the projecting ends of the legs of the U-shaped clamping member outwardly of said projection for drawing the bight portion of the U-shaped member towards the clamping seat of the projection in releasable clamping relationship.

References Cited in the file of this patent

UNITED STATES PATENTS

| 1,283,793 | Keator | Nov. 5, 1918 |
| 2,054,871 | Wells | Sept. 22, 1936 |
| 2,201,608 | Causey | May 21, 1940 |
| 2,540,784 | Hocher | Feb. 6, 1951 |

FOREIGN PATENTS

| 326,895 | Great Britain | Mar. 27, 1930 |